Jan. 4, 1966 R. A. HOLLAND 3,227,109
LOCKING AND REELING MECHANISM FOR TABLES AND THE LIKE
Filed Oct. 16, 1964 2 Sheets-Sheet 1

ROBERT A. HOLLAND,
INVENTOR

By Perrott, Bell, Seltzer,
Park & Heard
ATTORNEYS

Jan. 4, 1966  R. A. HOLLAND  3,227,109
LOCKING AND REELING MECHANISM FOR TABLES AND THE LIKE
Filed Oct. 16, 1964  2 Sheets-Sheet 2
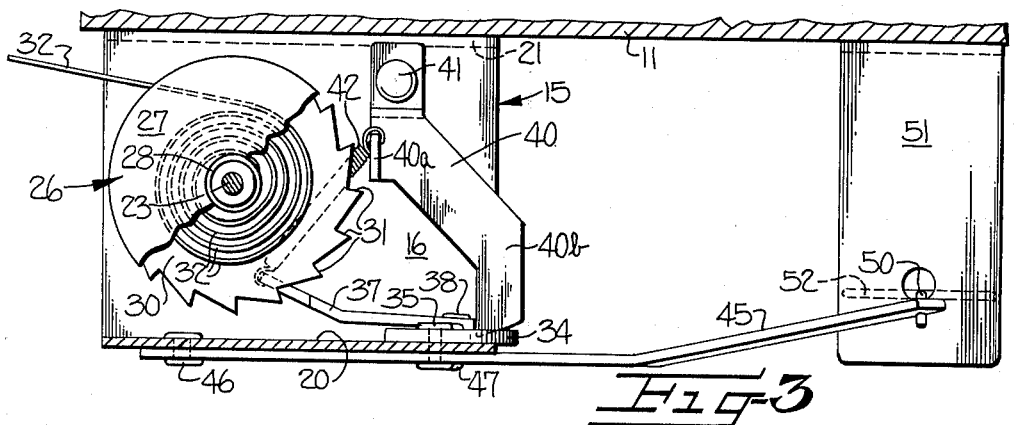
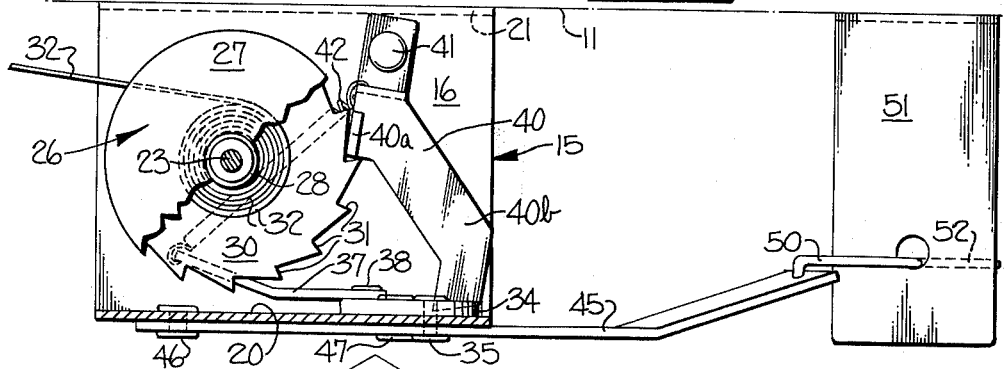
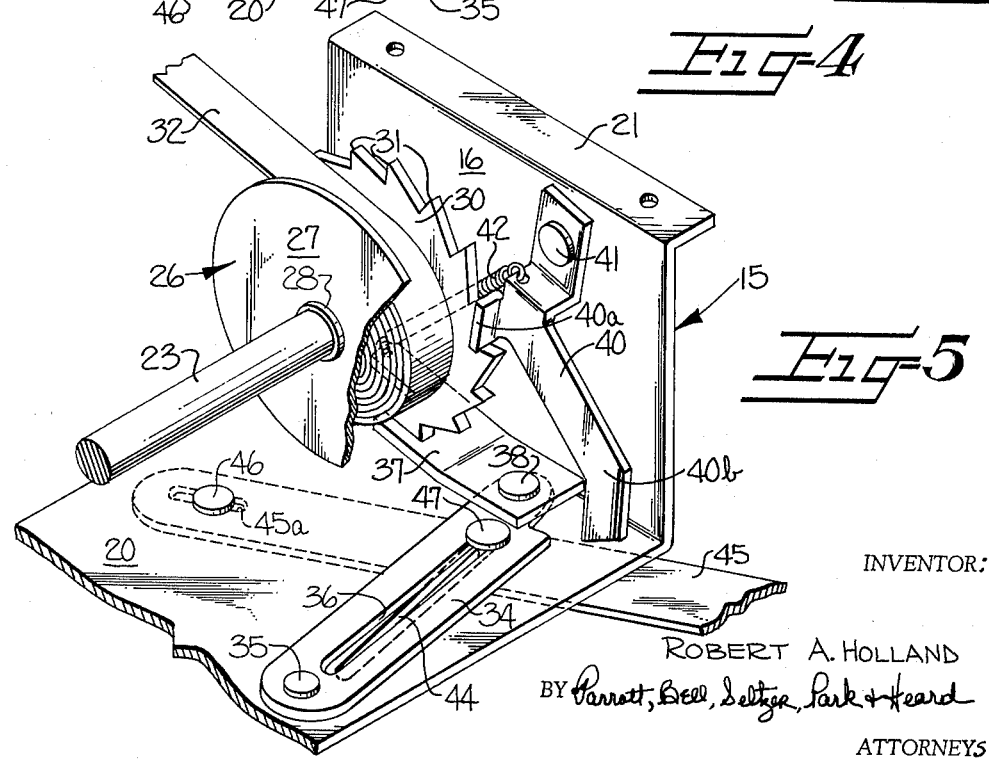
INVENTOR:
ROBERT A. HOLLAND
BY Parrott, Bell, Seltzer, Park & Heard
ATTORNEYS

United States Patent Office 3,227,109
Patented Jan. 4, 1966

3,227,109
LOCKING AND REELING MECHANISM FOR TABLES AND THE LIKE
Robert A. Holland, 341 Park Blvd., Winston-Salem, N.C.
Filed Oct. 16, 1964, Ser. No. 404,359
5 Claims. (Cl. 108—89)

This invention relates to locking and reeling mechanisms for tables and the like and more particularly to a mechanism for reeling in the end portions of an extensible table or the like and locking these end portions in any desired position.

In using extensible tables, such as dining room tables or the like, it is frequently desirable to extend the halves or end portions of the table and to insert one or more leaves therein to provide a table of greater length. However, problems have been encountered in maintaining the end portions in the desired position and the leaves clamped therebetween since the end portions frequently tend to move further apart during use.

Prior attempts have been made to solve these problems and have taken the form of devices for reeling in the extensible end portions of a table of this type and for locking the same in various positions. However, these conventional devices have not proved successful solutions to the problems since the same can not be locked in any desired position, but rather can only be locked in certain positions. The most common of these prior devices utilize a ratchet and pawl mechanism for reeling in the extensible end portions of the table and another locking pawl which cooperates with the ratchet for locking the end portions in various positions. Therefore, the end portions may only be locked in certain positions, which positions are spaced apart a distance corresponding to the length of the increments between teeth on the ratchet.

Since the leaves for such tables are of varying widths, it has heretofore been virtually impossible to lock the end portions of an extensible table in all positions required by the various width leaves while insuring that such leaves are properly clamped therebetween. With conventional locking devices, the increments between the positions in which the end portions could be locked are such that the leaves are frequently either too loose, wherein the danger of tipping or dislodgement is ever present, or too tight, wherein it is very difficult to reel the end portions to this position and also there is frequent damage to the reeling and locking devices.

It is therefore an object of this invention to provide a novel mechanism for reeling in the end portions of an extensible table and for locking these ends in any desired position.

It is a more specific object of this invention to provide a ratchet and pawl mechanism for reeling in the end portions of an extensible table which will lock the same in any desired position irrespective of the increments between the teeth of the ratchet.

Some of the objects of the invention having been stated, other objects will appear as the description proceeds when taken in conjunction with the accompanying drawings, in which:

FIGURE 1 is a perspective view of an extensible table utilizing the locking and reeling mechanism of the present invention;

FIGURE 2 is a top sectional plan view of the locking and reeling mechanism of this invention;

FIGURE 3 is a sectional view taken substantially along the line 3—3 in FIGURE 2;

FIGURE 4 is a view similar to FIGURE 3 and illustrating the mechanism in another operative position; and FIGURE 5 is a fragmentary perspective view with portions broken away for clarity of the reeling and locking mechanism of this invention.

Referring now to the drawings, there is shown in FIGURE 1 a conventional extensible table, generally indicated by the reference numeral 10, having end portions 11 and 12 mounted for sliding movement toward and away from each other by conventional means. When end portions 11 and 12 are moved apart, the same are adapted to receive one or more leaves 13 therebetween.

A mechanism 14 for moving end portions 11 and 12 toward each other and for locking these end portions in any desired position is provided therebeneath and includes a generally U-shaped frame 15 having side walls 16 and 17 connected by a bottom wall 20. The side walls 16 and 17 include flange portions 21 and 22, respectively, which are secured to the underside of one of the end portions of the table 10, such as end portion 11, by any suitable means, such as screws.

A shaft 23 is mounted at its opposite ends in bearings 24 and 25 mounted on side walls 16 and 17, respectively, of the U-shaped frame 15. The shaft 23 carries a reel member 26 for rotation relative thereto and which comprises a first flange 27 mounted on one end of a drum portion 28 and a ratchet wheel 30 carried by the other end of drum 28 in driving relation thereto and defining a second flange. The ratchet wheel 30 has a plurality of teeth 31 around the circumference thereof.

The reel 26 carries a roll or coil of an elongate, flexible tape-like member 32, which is preferably of spring steel and has one end thereof secured to drum portion 28, as may be seen in FIGURE 3, and is wound on drum portion 28 in such a manner that the other end portion may be unwound or unreeled therefrom, but will tend to return to its original coiled condition with considerable force. This other end of spring 32 is secured to the underside of the other end portion 12 of table 10. Therefore, when the end portions 11 and 12 of table 10 are spaced apart, spring 32 will bias the same toward each other. However, the bias of spring 32 is not strong enough to pull the end portions 11 and 12 together, but insures that there is no slack in the tape-like spring member 32 connecting reel 26 to the other end portion 12 for prompt and immediate movement of the end portions toward each other upon rotation of reel 26 in a direction to rewind spring 32 thereon.

Means is provided for rotating reel 26 in a clockwise direction to rewind spring 32 thereon and comprises a first lever 34 (FIGURES 2 and 5) pivotally mounted at one end thereof on the bottom wall 20 of the U-shaped frame 15 by a pivot pin 35. The lever 34 has an elongate, longitudinally extending slot 36 therein and an actuating pawl 37 fixedly mounted on the other end thereof by pin 38. Actuating pawl 37 extends laterally outwardly from lever 34 into operative association with the teeth 31 on ratchet wheel 30 for rotating ratchet wheel 30 upon pivotal movement of lever 34 about its pivot in a manner to be described.

A holding or locking pawl 40 is pivotally mounted by a pin 41 on the side wall 16 of the U-shaped frame 15 and has a first portion 40a which extends outwardly into operative association with the teeth 31 on ratchet wheel 30 and a second portion 40b which extends downwardly into the path of lever 34 as the same pivots away from ratchet wheel. It is noted that portion 40b of pawl 40 is spaced from ratchet wheel 30 a distance sufficient for lever 34 to retract actuating pawl 37 sufficiently to catch the next tooth without moving pawl 40. A suitable spring 42 is connected between the locking pawl 40 and the actuating pawl 37 to bias the same toward engagement with the teeth 31 of the ratchet wheel 30.

Means is provided for pivoting lever 34 about its pivot and also for locking the same and hence reel 26 (through ratchet wheel 30 and actuating pawl 37) in any desired position. This means includes an elongate slot 44 in bottom wall 20 of U-shaped frame 15 which extends from a point close to the pivot pin 35 but offset slightly laterally thereof to a point close to the ratchet wheel 30 at the other end and at an acute angle to the side edge of bottom wall 20.

A second elongate lever 45 has an elongate opening 45a in one end through which penetrates a pivot pin 46 to mount lever 45 on the underside of bottom wall 20 of the U-shaped frame 15 for pivotal and limited longitudinal sliding movement. The lever 45 has a pin 47 mounted on a medial portion thereof and extending upwardly therefrom through the slot 44 in the bottom wall 20 and the slot 36 in the first lever 34. The other end of lever 45 is connected to an operating push rod 50 which is slidably mounted in a bracket 51 mounted on the underside of the end portion 11 of the table 10. The push rod 50 has a ring member 52 secured to the outer end thereof for manual reciprocation of the push rod laterally of the table 10, as may be seen in FIGURE 1.

In operation, when it is desired to move the table end portions 11 and 12 apart, to a position such as is illustrated in FIGURE 1, the push rod 50 is moved laterally inwardly of the table 10 to the solid line position of FIGURE 2. This movement pivots lever 45 in a clockwise direction (as seen in FIGURE 2) about pivot pin 46 which moves pin 47 in the slots 36 and 44 to the ends thereof closest to pivot pin 35 of lever 34. This movement of pin 47 cams lever 34 outwardly away from ratchet wheel 30 about pivot pin 35 since this adjacent end of slot 44 is disposed a greater distance away from ratchet wheel 30 than the other end of slot 44.

Upon this pivotal movement of lever 34, actuating pawl 37 is moved away from the teeth 31 on ratchet wheel 30 a distance sufficient to completely clear the same, and at the same time, lever 34 engages portion 40b of pawl 40 and pivots locking pawl 40 about pin 41 to move the portion 40a thereof out of locking engagement with the teeth 31 on ratchet wheel 30. The reel 26 is then freely rotatable on shaft 23 and the end portions 11 and 12 may be pulled apart against the bias of spring 32 and while unwinding spring 32 from reel 26. One or more leaves 13 may now be inserted between the end portions 11 and 12.

To move the end portions 11 and 12 toward each other and into clamping relation with the leaf 13, the push rod 35 is moved laterally outwardly of the table 10 from the position shown in FIGURE 2. This action moves the lever 45 in a counterclockwise direction about its pivot pin 46 to the dotted line position of FIGURE 2. This movement of the lever 45 moves pin 47 in slots 44 and 36 and cams lever 34 about pivot pin 35 toward ratchet wheel 30. This releases locking pawl 40 and moves actuating pawl 37 into engagement with the teeth 31 of ratchet wheel 30 and rotates the ratchet wheel 30 and reel 26 one increment to reel in spring 32 and thus move the end portions 11 and 12 closer together.

Push rod 50 is again moved laterally inwardly but not to such an extent that pin 47 will be moved completely to the ends of slots 44 and 36 adjacent pivot pin 35. This inward movement is just sufficient to pivot lever 34 sufficiently to retract actuating pawl 37 to catch the next tooth 31 on ratchet wheel 30 but not to such an extent that locking pawl 40 is released from engagement with the teeth 31 of ratchet wheel 30. This partial reciprocation of push rod 50 is continued until end portions 11 and 12 are in properly clamped relation either to a leaf or leaves 13 or to each other. It is noted that the relationship of the slots 44 and 36 is such that reel 26 will be locked in any position of lever 45, except the release position wherein pin 47 is at the ends of slots 44 and 36 adjacent pivot pin 35, due to the "scissors" action of lever 34 and the portion of bottom wall 20 having slot 44 therein on pin 47.

Thus it may be seen, that this invention has provided a mechanism for reeling in the end portions of an extensible table to any desired position and for locking of these end portions in the desired position.

In the drawings and specification there has been set forth a preferred embodiment of the invention and, although specific terms are employed, they are used in a generic and descriptive sense only, and not for purposes of limitation, the scope of the invention being defined in the claims.

I claim:
1. A locking and reeling mechanism for end portions of an extensible table or the like comprising
   (a) a generally U-shaped frame including spaced apart side walls connected at their lower ends by a bottom wall, the upper ends of such side walls being adapted to be mounted on the underside of one end portion of the table, and the bottom wall having an elongate slot therein extending longitudinally thereof at an acute angle to the side of the bottom wall,
   (b) reel means rotatably mounted on and between said side walls of said frame for rotation about a horizontal axis, and disposed laterally of one end of said slot in said bottom wall,
   (c) an elongate flexible member wound on said reel means and adapted to have the outer end portion thereof connected to the other end portion of the table, said flexible member being adapted to be unreeled from said reel means when the end portions of the table are moved away from each other,
   (d) a ratchet wheel operatively connected to said reel means for rotation therewith and having a plurality of teeth around the periphery thereof,
   (e) a holding pawl pivotally mounted on one of said side walls of said frame adjacent said ratchet wheel for pivotal movement about a horizontal pivot and engageable with the teeth of said ratchet wheel for normally preventing rotation of said ratchet wheel and hence said reel means in a direction to unwind said flexible member while permitting rotation thereof in the opposite direction,
   (f) a first lever pivotally mounted at one end on said bottom wall adjacent to but off-set slightly laterally from the other end of said slot in said bottom wall and extending outwardly from said one end thereof in superposed relation to said slot for pivotal movement about a vertical pivot toward and away from said ratchet wheel, said first lever having an elongate slot extending longitudinally therein above said slot in said bottom wall,
   (g) an actuating pawl mounted on the other end of said first lever for reciprocatory movement into and out of engagement with the teeth of said ratchet wheel for rotating said ratchet wheel in said opposite direction to wind said flexible member onto said reel means,
   (h) a second lever pivotally mounted on said bottom wall beneath the same for pivotal movement about a vertical pivot and extending laterally of said bottom wall and said first lever for manual movement thereof about its pivot, and
   (i) a pin carried by a medial portion of said second lever and penetrating through said slot in said bottom wall of said frame means and said slot in said first lever for reciprocating said first lever about its pivot upon manual movement of said second lever about its pivot, said pin and the portions of said bottom wall and said first lever defining said slots cooperating to lock said first lever in any position to which the same is moved to lock said reel means in any desired rotative position so that the end portions of the extensible table may be locked in any desired position.

2. A locking and reeling mechanism according to claim 1 wherein said flexible member comprises a tape-like spring normally wound into a coil on said reel means and having the inherent resiliency thereof biasing the same toward the coiled condition to insure that no slackness occurs in the portion thereof unwound from said reel means when the end portions of the table are moved away from each other, and wherein said holding pawl extends downwardly into the path of said first lever in its movement away from said ratchet wheel and is spaced from said ratchet wheel a predetermined distance so that said holding pawl is released from said ratchet wheel only upon a movement of said first lever away from said ratchet wheel greater than is necessary for rotation of said ratchet wheel by said actuating pawl to permit unwinding of the flexible member from said reel means.

3. A locking and reeling mechanism for end portions of an extensible table or the like comprising
   (a) frame means adapted to be mounted on the underside of one end portion of the table,
   (b) reel means rotatably carried by said frame means,
   (c) an elongate flexible member wound on said reel means and adapted to have the outer end portion thereof connected to the other end portion of the table, said flexible member being adapted to be unreeled from said reel means when the end portions of the table are moved away from each other,
   (d) a ratchet wheel operatively connected to said reel means for rotation therewith and having a plurality of teeth around the periphery thereof,
   (e) an actuating pawl mounted for reciprocatory movement into and out of engagement with the teeth on said ratchet wheel for rotating said ratchet wheel in a direction to wind said flexible member on to said reel means,
   (f) a lever pivotally mounted at one end on said frame means and connected at the other end to said actuating pawl for reciprocating said actuating pawl into and out of engagement with the teeth of the ratchet wheel, said lever having a longitudinally extending slot therein extending for a predetermined distance from a point adjacent to the pivot point of said lever toward said actuating pawl carried thereby,
   (g) a portion of said frame means underlying said lever having an elongate slot therein extending from a point adjacent the pivot point of said lever to a point laterally thereof adjacent said reel means,
   (h) a second lever pivotally mounted on said frame means for manual pivotal movement, and
   (i) a pin carried by said second lever and penetrating through said slots in said frame means and said first lever for pivoting said first lever about its pivot upon manual pivotal movement of said second lever and for locking said first lever in any desired position.

4. A locking and reeling mechanism according to claim 3 wherein said flexible member is biased toward coiled condition on said reel means to insure that no slackness occurs in the portion thereof unwound from the reel means when the portions of the table are moved away from each other.

5. A locking and reeling mechanism for end portions of an extensible table or the like comprising
   (a) frame means adapted to be mounted on the underside of one end portion of the table,
   (b) reel means rotatably carried by said frame means,
   (c) an elongate flexible member wound on said reel means and adapted to have the outer end portion thereof connected to the other end portion of the table, said flexible member being adapted to be unreeled from said reel means when the end portions of the table are moved away from each other,
   (d) a ratchet wheel operatively connected to said reel means for rotation therewith and having a plurality of teeth around the periphery thereof,
   (e) a holding pawl pivotally mounted on said frame means adjacent said ratchet wheel and engageable with the teeth of said ratchet wheel for normally preventing rotation of said ratchet wheel and hence said reel means in a direction to unwind said flexible member, but permitting rotation thereof in the opposite direction,
   (f) an actuating pawl mounted for reciprocatory movement into and out of engagement with the teeth on said ratchet wheel for rotating said ratchet wheel in said opposite direction to wind said flexible member onto said reel means, and
   (g) manually operable means operatively connected to said actuating pawl for reciprocating the same including
      (1) a first lever pivotally mounted at one end on said frame means and carrying said actuating pawl on the other end thereof, a portion of said first lever having an elongate longitudinally extending slot therein extending for a predetermined distance from a point adjacent the pivot point at one end of said lever toward said actuating pawl carried by the other end thereof,
      (2) a portion of said frame underlying said first lever having an elongate slot therein extending from a point adjacent to the pivot point of said lever to a point laterally thereof adjacent said reel means,
      (3) a second lever pivotally mounted on said frame means for manual pivotal movement, and
      (4) a pin carried by said second lever and penetrating through said slots in said frame means and said first lever for pivoting said first lever about its pivot point upon manual movement of said second lever and for releasably locking said first lever in any pivotal position to maintain said ratchet wheel and hence said reel means in any position, irrespective of the increments between the teeth of said ratchet wheel so that the end portions of the table may be locked in any desired position.

References Cited by the Examiner
UNITED STATES PATENTS

| | | | |
|---|---|---|---|
| 317,825 | 5/1885 | McLagan | 108—87 |
| 941,722 | 11/1909 | Moulton | 254—154 |
| 1,159,953 | 11/1915 | Kilborn | 254—164 |
| 1,181,608 | 5/1916 | Nelson | 108—88 |
| 1,208,018 | 12/1916 | Rogginger | 108—87 |
| 2,946,563 | 7/1960 | Eaton | 254—164 |

FRANK B. SHERRY, *Primary Examiner.*